United States Patent [19]

Kamiya

[11] Patent Number: 4,807,185
[45] Date of Patent: Feb. 21, 1989

[54] STACK POINTER CONTROL CIRCUIT

[75] Inventor: Shigeo Kamiya, Tokyo, Japan

[73] Assignee: Kabushiki Kaisha Toshiba, Kawasaki, Japan

[21] Appl. No.: 937,828

[22] Filed: Dec. 4, 1986

[30] Foreign Application Priority Data

Mar. 28, 1986 [JP] Japan ............... 61-068408

[51] Int. Cl.⁴ .............................. G06F 9/42
[52] U.S. Cl. .............................. 364/900
[58] Field of Search ... 364/900 MS File, 200 MS File

[56] References Cited

U.S. PATENT DOCUMENTS

| | | | |
|---|---|---|---|
| 4,268,903 | 5/1981 | Miki et al. | 364/200 |
| 4,438,492 | 3/1984 | Harmon, Jr. et al. | 364/200 |
| 4,443,865 | 4/1984 | Schultz et al. | 364/900 |
| 4,445,190 | 4/1984 | Pierschalla et al. | 364/900 |
| 4,451,891 | 5/1984 | Baba | 364/431.12 |
| 4,459,657 | 7/1984 | Murao | 364/200 |
| 4,484,274 | 11/1984 | Berenbaum et al. | 364/200 |
| 4,524,416 | 6/1985 | Stanley et al. | 364/200 |
| 4,607,332 | 8/1986 | Goldberg | 364/300 |
| 4,736,317 | 4/1988 | Hu et al. | 364/200 |

Primary Examiner—Thomas M. Heckler
Assistant Examiner—Maria Napiorkowski
Attorney, Agent, or Firm—Foley & Lardner, Schwartz, Jeffery, Schwaab, Mack, Blumenthal & Evans

[57] ABSTRACT

In the conventional CPU, when an interruption occurs during execution of a stack control instruction, the interrupted stack control instruction is executed again beginning from the start, so that a stack memory address currently designated by the stack pointer does not match that corresponding to the start of the instruction execution, thus resulting in a program error. To overcome the above problem, at the start of information saving and/or return operation, a stack memory address stored in the first register so as to be read next is additionally stored in the second register. Although the above operation is executed on the basis of the stack memory address stored in the first register, in case an interrupt occurs, the stack memory address stored in the second register is set to the first register before executing again the interrupted stack control instruction.

9 Claims, 3 Drawing Sheets

STACK POINTER CONTROL CIRCUIT

BACKGROUND OF THE INVENTION

1. Field of the Invention

The present invention relates to a stack pointer control circuit for saving information stored in a predetermined register into a stack memory or returning the information read from the stack memory to the predetermined register.

2. Description of the Prior Art

In a subroutine call instruction or a return instruction for computers, there exists such an operation that saves a value of a program counter into a stack memory or returns the saved value from the stack memory to the program counter or such an instruction that saves a value of a specific register into a stack counter or returns the saved information from the stack counter to the specific register as in a push instruction or pop instruction. Further, a push-all instruction and a pop-all instruction such that values in plural or all registers are saved to the stack memory or returned from the stack memory at the same time are effective instructions when an interrupt processing is effected, for instance.

The stack pointer is a circuit for designating an address of a stack memory to which register information is saved or for designating an address of a stack memory from which the stored information is returned to the register. However, in a stack pointer for push-all instructions or pop-all instructions, plural addresses of the stack memory at which plural register values are to be stored or plural addresses of the stack memory at which plural values to be returned to the plural registers are stored should be determined in sequence.

In the stack memory available for the push-all or pop-all instructions, a memory capacity for storing a plurality of values is necessary to store values of plural registers, and a push-all or a pop-all instruction is enabled within a range of the memory capacity. However, when the push-all instruction is executed in excess of the memory capacity of the stack memory, or particularly when a so-called stack underflow occurs such that the push-all instruction is executed in excess of the memory capacity of the stack memory during the push-all instruction operation and therefore there exist no memory locations to which register values are saved in the stack memory, an interruption occurs for processing this stack underflow. The above problems also arise in the pop-all instruction in the same way as in the stack underflow of the push-all instruction. That is, when a plurality of values are read out of the stack memory in sequence to return the values stored in the stack memory to the register, if so-called stack overflow occurs such that address information is read back in excess of the upper limit of the stack memory, for instance, an interruption occurs for processing this stack overflow. Interruptions which occur during the execution of the push-all instruction or the pop-all instruction are not necessarily limited to the above-mentioned stack overflow or underflow; but, various interruptions due to other reasons often occur. Therefore, the stack control instructions such as the push-all instruction or pop-all instruction are often interrupted during the processing due to the occurence of these interruptions.

As described above, in case an interruption occurs during the execution of a stack control instruction, the CPU enters an interrupt processing routine during the stack control instruction operation to execute an interrupt processing. However, since the stack control instruction has already been executed midway, a stack memory address at the time of this interruption is kept stored in the stack pointer. In more detail, the assumption is made that during the operation of a stack control instruction for saving 10 register values to a stack memory, an interruption occurs and the saving processing to the stack memory is interrupted after 6 register values have been saved to the stack memory, so that the CPU enters an interrupt routine. In this state, the stack pointer is kept designating an address of the stack memory at which the succedding 7th address value is to be saved. Under these conditions, when the interrupt processing has been executed, in usual the CPU is so determined as to execute again the interrupted stack control instruction beginning from the start. However, at this moment, since the stack memory address designated by the stack pointer is that to which the 7th register is to be saved as described above, the stack pointer is not designating the first address corresponding to the time at which the stack control instruction starts. That is, since the stack memory address designated by the stack pointer does not match that obtained at the start of the instruction execution, there exists a problem in that various program errors occur such that a register value is saved to a different stack memory or information is returned from a different stack memory to the register in accordance with the stack control instruction executed again after the interrupt processing has been completed.

In this case, if the cause of interruption is limited to the stack overflow or underflow, there may exist a method of executing the instruction after having previously confirmed whether the stack areas to be pushed or popped are secured or not. However, in this method, there still exists a problem in that it takes time to confirm the stack areas and further it is impossible to completely cope with the interruption when the interruption results from other reasons.

SUMMARY OF THE INVENTION

With these problems in mind, therefore, it is the primary object of the present invention to provide a stack pointer control circuit which can securely execute again a stack control instruction such as a push-all instruction or pop-all instruction, for instance, without producing erroneous operation even if the above instruction is interrupted while the stack control instruction is being executed.

To achieve the above-mentioned object, a stack pointer control circuit for saving a value in a predetermined register to a stack memory and returning the value read out of the stack memory to the predetermined register according to the present invention comprises (a) first register means for storing a stack memory address to be read next; (b) second register means for storing an address stored in said first register means at the start of saving and return operations; (c) control means for saving a value stored in the predetermined register to the stack memory on the basis of the address stored in said first register and for returning the value read out of the stack memory to the predetermined register on the basis of the address stored in said first register; and (d) stopped address processing means for setting a value in said second register means to said first register means in response to a stop signal generated during the saving and return operations.

According to the present invention, at the start of the information saving operation to the stack memory or the information return operation from the stack memory, a stack memory address stored in the first register so as to be read next is stored in the second register, and the information saving operation to the stack memory or the information return operation from the stack memory is executed on the basis of the address stored in the first register. Therefore, in case an interrupt signal is supplied to the circuit during the saving or return operation so that the stack control instruction is interrupted, since the address stored in the second register at the start of the saving or return operation is set to the first register and therefore the top-of-stack address is held securely even if the stack control instruction is interrupted, it is possible to continue a stable operation without producing an erroneous operation such as program error.

Further, during the execution of a stack control instruction, since it is unnecessary to previously confirm the stack overflow or the stack underflow as in the conventional method, it is possible to attain a high speed stack pointer control operation.

BRIEF DESCRIPTION OF THE DRAWINGS

The features and advantages of the stack pointer control circuit according to the present invention will be more clearly appreciated from the following description taken in conjunction with the accompanying drawing in which.

DETAILED DESCRIPTION OF THE PREFERRED EMBODIMENTS

Embodiments of the present invention will be described hereinbelow with reference to the attached drawings.

Figure 1:
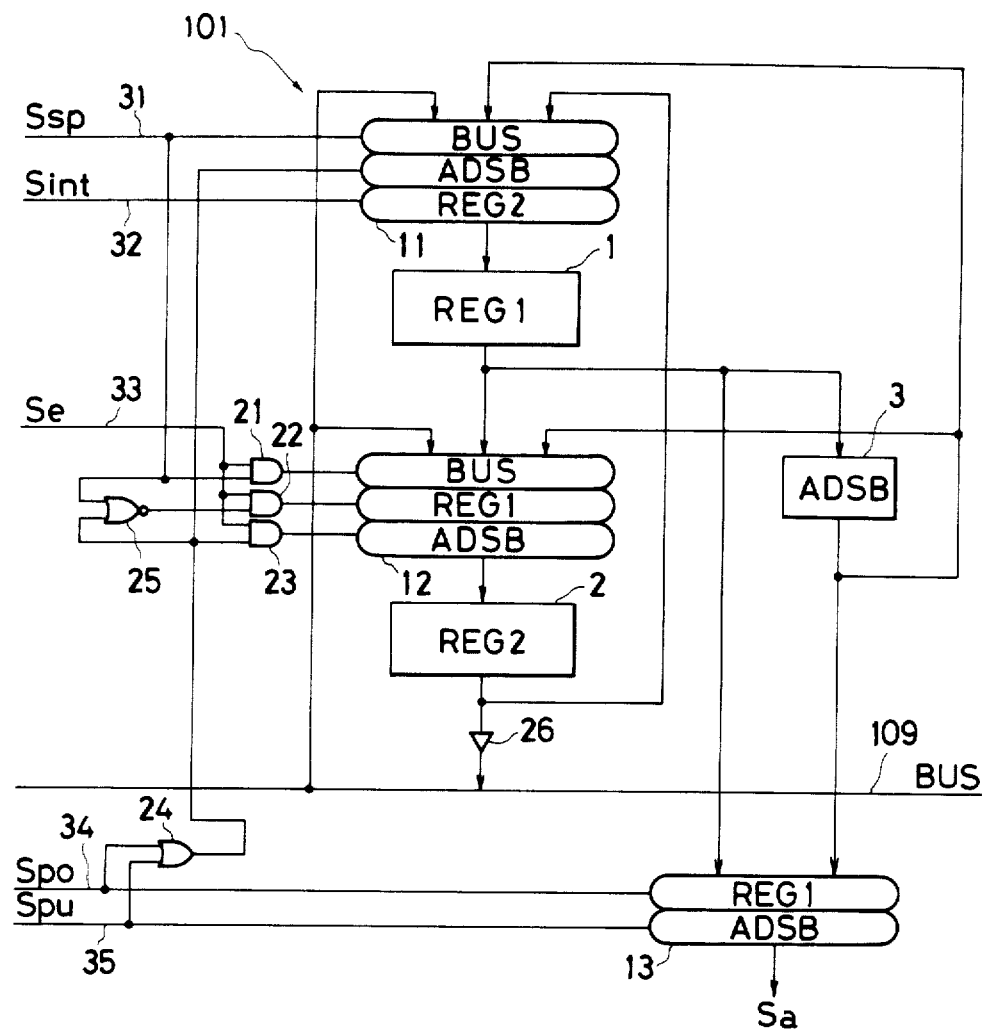
FIG. 1 is a circuit diagram of a first embodiment of the stack pointer control circuit according to the present invention.
Figure 2:
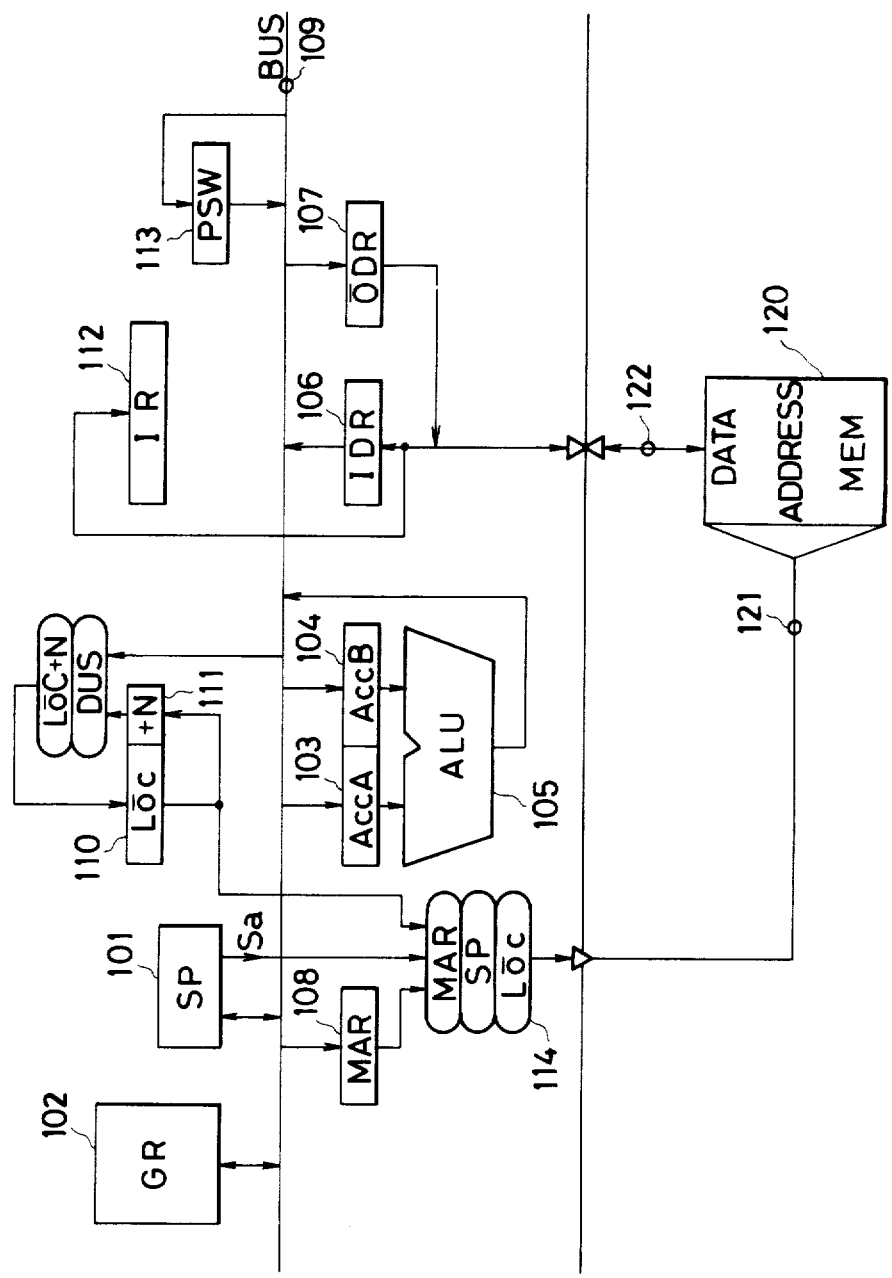
FIG. 2 is a block diagram of a CPU to which the stack pointer control circuit shown in FIG. 1 is applied.

FIG. 1 is a block diagram of a first embodiment of the stack pointer control circuit 101 according to the present invention and FIG. 2 is a block diagram showing the whole system configuration of a CPU to which the stack pointer control circuit 101 is incorporated.

The CPU shown in FIG. 2 executes various stack control instructions such as push, pop, push-all, pop-all, subroutine call, return instruction, etc. by means of a stack pointer control circuit 101. The circuits other than the stack pointer control circuit 101 are the same as those of the ordinary CPU. That is, the CPU is provided with a CPU inner bus 109, to which a general register (GR) 102, a stack pointer control circuit(SP) 101, a memory address register (MAR) 108, an input accumulator A (ACCA) 103, an input accumulator B (ACCB) 104, an input register (IDR) 106, an output register (ODR) 107, a PSW register 113, etc. are connected. Further, the CPU is provided with an arithmetic and logic unit (ALU) 105, a location counter (LOC) 110, an instruction register (IR) 112, etc. The accumulator A 103 and the accumulator B 104 are connected to the ALU 105, and the output of the ALU 105 is connected to the inner bus 109. Input data to be calculated by the ALU 105 are set to the accumulators A and B, and the calculated results are outputted to the inner bus 109 through the ALU 105.

Further, the CPU is provided with an external memory (MEM) 120 which stores various instructions constituting CPU programs and includes a part of a stack memory controlled by the stack pointer control circuit 101. An output of the memory address register 108 is connected to this external memory 120 via a selector ciruict 114 to supply addresses to this memory 120. Hereinafter, an input line which supplies addresses to this memory 120 in referred to as an address line 121. Output data read out of the memory 120 are supplied to the inner bus 109 via the input register 106. However, when the read data are instructions, that data are supplied to the instruction register 112 and then decoded by an instruction decode section (not shown) before being executed. Further, input data written in the memory 120 are supplied from the inner bus 109 via the output register 107. Hereinafter, the data line from which data read out of the memory 120 are outputted and to which data written in the memory 120 are inputted is referred to as a memory data bus 122.

The location counter 110 is a counter for storing a top address of an instruction to be executed next by the CPU. The address stored in this location counter 110 is supplied to the memory 120 via the selector circuit 114 to read the succeeding instruction from the memory 120. Further, the above address in the counter 110 is updated to the succeeding address by adding a predetermined number of bits corresponding to a bit length to the address through the adder 111.

A stack pointer output, that is, a stack address signal $S_a$ to the stack memory composed of the memory 120 is supplied from the stack pointer control circuit 101 to the memory 120 via the selector circuit 114. The general register 102 composed of a plurality of register for storing various data is controlled by the stack pointer control circuit 101 in such a way that the values stored in this general register 102 are saved to a stack memory designated by the stack address signal $S_a$ of the stack pointer control circuit 101 or that the information stored in the stack memory designated by the stack address signal $S_a$ is returned to the general register 102.

The stack pointer control circuit 101 will be described in greater detail with reference to FIG. 1. The stack pointer control circuit 101 is provided with a first register (REG 1) 1 for storing a top address of a stack memory to be read next (referred to as top-of-stack address $A_{top}$ hereinafter) and a second register (REG 2) 2 for storing the same value as in the first register at the start when various stack control instructions such as push instruction, pop instruction, etc. are executed. A first selector circuit 11 and a second selector circuit 12 are connected separately to each of the registers 1 and 2 on the input side thereof. Further, a third selector circuit 13 and an adder/subtractor circuit 3 are connected to the output of the first register 1.

In the case where the stack control instruction is an instruction for returning information stored in the stack memory to the general register 102 as in a pop instruction or a pop-all instruction, a top-of-stack address $A_{top}$ stored in the first register 1 is directly outputted from the third selector circuit 13 as the stack address signal $S_a$. This stack address signal $S_a$ is supplied to the memory 120 via the selector circuit 114 as shown in FIG. 2 to read information stored at the address of the stack memory section of the memory 120. The information read out of the stack memory is returned to the general register 102 from the memory 120 via the input register 106 and the inner bus 109.

To the first register 1, a data from the internal bus 109, an output data from the adder/subtracter circuit 3 and a value of the second register 2 are set. A data from the internal bus 109 is set to the first register 1 when a "1" level load stack pointer signal $S_{sp}$ is supplied to the first selector circuit 11 via a lead wire 31 in order to process an instruction for setting a given value to the stack pointer, as when a load stack pointer instruction is executed. An output data of the adder/subtractor circuit 3 is set to the first register 1 when a stack control instruction such as pop or push instruction is executed. In this case, a top-of stack address $A_{top}$ is read from the first register 1; a "1" level stack access signal $S_{po}$ or $S_{pu}$ is supplied to the lead wire 34 or 35 to access a stack memory corresponding to this top address; and further this stack access signal $S_{po}$ or $S_{pu}$ is supplied to the first selector circuit 11 via the OR gate 24. The value of the second register 2 is set to the first register 1 when an interruption occurs and an interrupt signal $S_{int}$ is supplied to the lead wires 32.

Further, to the second register 2, a data from the internal bus 109 via the second selector circuit 12, a value in the first register 1 and an output data of the adder/subtracter 3 are set. These data are set, respectively, at the timing when a "1" level and signal $S_e$ are supplied via a lead wire 33 at the end of the stack control instruction. The data from the internal bus 109 is set to the second register 2 when the load stack pointer signal $S_{sp}$ and the end signal $S_e$ are supplied to the second selector circuit 12 via an AND gate 21. A value of the first register 1 is set to the second register 2 when an end signal $S_e$ is supplied where the load stack pointer signal $S_{sp}$ and the stack access signal $S_{po}$ or $S_{pu}$ are absent. In order to form the timing when the load stack pointer signal $S_{sp}$ and the stack access signal $S_{po}$ or $S_{pu}$ are both absent, a NOR gate 25 is provided. To this NOR gate 25, the load stack pointer signal $S_{sp}$ and the stack access signal $S_{po}$ or $S_{pu}$ passed through the OR gate 24 are supplied. The output of the NOR gate 25 is supplied to the second selector circuit 12 via the AND gate 22. Further, the output data of the adder/subtractor 3 is set to the second register 2 when the stack access signal $S_{po}$ or $S_{pu}$ passed through the OR gate 24 and the end signal $S_e$ are simultaneously supplied to the second selector circuit 12 via the AND circuit 23.

Further, the value in the first register 1 is added or subtracted by the adder/subtracter circuit 3, and outputted from the adder/subtracter circuit 3 via a third selector circuit 13 as a stack address signal $S_a$. Furthermore, the value returned to the first register 1 via the first selector circuit 11 (an added or subtracted value) is stored again in the first register 1. The value of the second register 2 is supplied to the internal bus 109 via a try state driver 26.

The operation of the stack pointer control circuit thus constructed according to the present invention will now be described hereinbelow.

The operation of the push instruction such that values of plural registers included in the general register 102 are saved in sequence to the stack memory or the push-all instruction such that values of all the registers are saved in sequence to the stack memory will be described.

When an address of the memory 120 at which a push instruction is stored is set to the location counter 110, this address is supplied to the memory 120 via the selector circuit 114, so that the push instruction is read out of the memory 120 and set to the instruction register 112. At the same time, the CPU adds an instruction length of the push instruction to the address value set to the location counter 110 through the adder 11, and sets this added value to the location counter 110 as an address of the instruction to be executed next.

Further, immediately before this push instruction begins to be executed, a top-of-stack address $A_{top}$ is set to the first and second register 1 and 2 of the stack pointer control circuit 101 in the same way.

Once the push instruction is set to the instruction register 112, this push instruction is decoded by a decode section (not shown) and executed. A first register value of the general register 102 to be first saved is transferred to the output register 107 via the internal bus 109. On the other hand, at this moment, a stack access signal $S_{pu}$ related to the push instruction is supplied to the stack pointer control circuit 101 via the lead wire 35, and then to the first selector circuit 11 via the OR gate 24. As a result, the first selector circuit 11 selects the output signal of the adder/subtracter circuit 3 to set this signal to the first register 1, and further this output signal of the adder/subtracter circuit 3 is outputted via the third selector circuit 13 as a stack address signal $S_a$ in response to the stack access signal $S_{pu}$. In more detail, at this moment, in the adder/subtracter circuit 3, a value of "2" corresponding to 2 bytes constituting one word, for instance, is subtracted from the top-of-stack address $A_{top}$ on the basis of a control operation (not shown) in response to the stack access signal $S_{pu}$, this subtracted address signal is set again to the first register 1 from the adder/subtracter circuit 3 via the first selector circuit 11, and is outputted as a stack address signal $S_a$ via the third selector circuit 13. As described above, at the time when the push instruction starts, a top-of-stack address $A_{top}$ is set to the first register 1. This top-of-stack address $A_{top}$ is an address to be read next out of the stack memory in the pop instruction. Therefore, in the push instruction, the register value is not saved to the stack memory corresponding to this top-of-stack address $A_{top}$, but saved to an address updated by one word from this top-of-stack address $A_{top}$. The above subtraction operation is effected by the adder/subtracter circuit 3 to update the address.

The stack address signal $S_a$ updated by the adder/subtracter circuit 3 is set to the first register 1, and simultaneously outputted from the stack pointer control circuit 101 via the third selector circuit 13 and supplied to the memory 120 via the selector circuit 114, so that a stack memory in the memory 120 at which the first register value to be saved by the push instruction is to be stored can be addressed. Therefore, as described above, the first register value set to the output register 107 is stored or saved to the addressed stack memory in the memory 120. Further, during the above operation, the old top-of-stack address $A_{top}$ stored in the second register 2 at the start of the present push instruction execution is kept unchanged.

As described above, once the first register value is stored in the stack memory, the succeeding register value is stored in the stack memory in the same way. In this succeeding operation, the address updated by the adder/subtracter circuit 3 in the first register saving operation and then stored in the first register 1 is further subtracted by the adder/subtracter circuit 3 for update. This updated stack address signal $S_a$ is supplied to the stack memory to save the succeeding register value to a stack memory corresponding to the updated address. Further, this updated address is set to the first register from the adder/subtracter circuit 3 via the first selector circuit 11 in the same way. Similarly, the same saving operations are effected in sequence for plural register values. During this operation, the old top-of-stack address $A_{top}$ stored in the second register 2 at the start of the present push instruction execution is kept unchanged.

The same operation is effected to the final register value to be saved into the stack memory by this push instruction. At the end of this push instruction, an end signal $S_e$ is supplied to the lead wire 33. This end signal $S_e$ is supplied to the second selector circuit 12 via the AND gate 23, through which the address updated by the adder/subtracter circuit 3 is set to the second register 2. Further, in these operations, when the address updating operation of the final register is effected by the adder/subtracter circuit 3, the finally updated address is supplied from the adder/subtracter circuit 3 to the first register via the first selector circuit 11, and simultaneously set from the adder/subtracter circuit 3 to the second register 2 via the second selector circuit 12. Further, after the stack access signal $S_{pu}$, passed through the OR gate 24, has been removed while this end signal $S_e$ is being supplied, the end signal $S_e$ is supplied to the second selector circuit 12 via the AND gate 22 to select the first register 1. At this moment, the finally updated address having already been set in the first register 1 is set from the first register to the second register 2. As described above, after the final register value has been saved into the stack memory, the succeeding top-of-stack address $A_{top}$ having the same value as that set in the first register 1 is set to the second register 2, so that the current push instruction operation is completed.

The operation of the case where an interruption occurs for some reason or other, for instance, due to the occurrence of stack underflow during the push instruction execution will be described hereinbelow.

During the saving operation of plural register values to the stack memory, when a value set in the first register 1 is subtracted by the adder/subtracter 3 and the updated address is supplied to the memory 120 via the third selector circuit 13 and the selector circuit 114 in order to store the final register value to the stack memory, in case there exists no stack memory location at which the final register value is to be stored because the updated address exceeds the lower limit address of the stack memory, since the final register value cannot be stored in the stack memory, an interruption occurs, so that the CPU branches off to an interrupt routine. As a result, an interrupt signal $S_{int}$ is supplied to the stack pointer control circuit 101 via the lead wire 32. In response to this interrupt signal $S_{int}$, the value in the second register 2, that is, the old top-of-stack address $A_{top}$ held at the second register 2 at the start of the present push instruction execution is set to the first register 1 via the first selector circuit 11. As a result, since the top-of-stack address $A_{top}$ the same as that at the first execution time of the push instruction is set to the first register 1 when the interrupted push instruction restarts, the push instruction can be executed without producing a program error because a different top-of-stack address $A_{top}$ will not be set. Further, in this case, the value in the stack memory is rewritten as that obtained before the final register value is saved by the push instruction.

Since the area of this rewritten stack memory is located outside the effective stack memory designated by the now set top-of-stack address $A_{top}$, even if the value in this outside area is rewritten, no erroneous operation occurs in program. Further, in this interruption operation, the value in the location counter 110 or the PSW register 113 is pushed to the stack memory, being held for temporary saving, and further returned to the location counter 110 or PSW register 113 after the interrupt processing.

The operation of the pop instruction such that values stored in the stack memory are returned in sequence to the plural registers of the general register 102 or the pop-all instruction such that the values are returned to all the registers will be described.

A pop instruction is read from the memory 120 on the basis of an address from the location counter 110, set to the instruction register 112, and decoded by the instruction decode section in the same way as in the push instruction. Further, at this moment, immediately before this pop instruction is executed, the top-of-stack address $A_{top}$ is of course set to the first and second registers 1 and 2 of the stack pointer control circuit 101.

When the pop instruction is decoded and the execution thereof starts, a stack access signal $S_{po}$ is supplied to the stack pointer control circuit 101 via the lead wire 34. In response to this stack access signal $S_{po}$, the third selector circuit 13 is activated, so that the top-of-stack address $A_{top}$ stored in the first register 1 is outputted from the third selector circuit 13 as a stack address signal $S_a$. This stack address signal $S_a$ is supplied from the stack pointer control circuit 101 to the memory 120 via the selector circuit 114 to read the stack memory information designated by the stack address signal $S_a$ from the memory 120. The information read out of the memory 120 is set to the input register 106 via the memory data bas 122, and then returned to the first register of the general register 102 via the internal bus 109 for storage. Thereafter, the top-of-stack address $A_{top}$ stored in the first register 1 is added by two corresponding to 2 bytes, for instance, constituting one word through the adder/subtracter 3 to update the stack pointer value designated by the first register 1. Further, during the above operation, the old top-of-stack address $A_{top}$ stored in the second register 2 at the start of the present pop instruction execution is kept unchanged as it is.

As described above, the stack memory value is returned to the register and the updated top-of-stack address $A_{top}$ is set to the first register 1. On the basis of this updated top-of-stack address $A_{top}$, the information stored in the stack memory is read in the same way and stored in the succeeding register. Further, the address updated by the adder/subtracter circuit 3 is set to the first register 1. In the same way, the information read out of the stack memory in sequence is stored in the final register. After the final register processing, the value of the first register 1 is processed for addition through the adder/subtracter circuit 3, and then set again to the first register 1 via the first selector circuit 11. In the same way as in the push instruction, at the end of this pop instruction, an end signal $S_e$ is supplied to the second register 2 to update the address thereof. As described above, after the stack memory value has been returned to the final register,t he succeeding top-of-stack address $A_{top}$ having the same value as that set in the first register 1 is set to the second register 2, so that the operation of the pop instruction set in the second register 2 is completed.

The operation of the case where an interruption occurs for some reason or other, for instance, due to the occurrence of stack overflow during the pop instruction execution will be described hereinbelow.

During the return operation of plural register values from the stack memory on the basis of the pop instruction, the assumption is made that an interruption occurs when the stack memory information is about to be returned to the final register for instance. That is, when a stack memory address corresponding to the final register set to the first register 1 is supplied to the memory 120 via the third selector circuit 13 and the selector circuit 114, the address exceeds the upper limit of the stack memory and therefore an interruption occurs because there is no stack memory location to be read. At this moment, the CPU branches to the interrupt processing routine to execute the interrupt processing, so that an interrupt signal $S_{int}$ is supplied from the CPU to the stack pointer control circuit 101. In response to this signal $S_{int}$, the old top-of-stack address $A_{top}$ stored in the second register 2 at the start of the present pop instruction execution is set to the first register 1 via the first selector circuit 11. As a result, since the top-of-stack address $A_{top}$ the same as at the start of the first execution of the pop instruction is set to the first register 1 when the interrupted pop instruction is restarted after the interrupt processing, it is possible to normally reexeucte the pop instruction. Further, in this case, although updated popped values are set to some registers which have been processed until the interrupt occurs and old values are set to the remaining register, there exists no problem because the pop instruction is executed again and therefore all the registers are set again. Further, in the above interrupt processing, the value in the location counter 110 or the PSW register 113 is temporarily saved to the stack memory in the same way as described above, and returned after the execution processing has been completed.

Further, in the stack pointer control circuit 101, in addition to the above operation, various operations are effected such that the value of the second register 2 is outputted to the internal bus 109 via the try state driver 26 or a data on the lateral bus 109 is set to the first register 1 via the first selector circuit 11 and then set to the second register 2 at the final cycle.

Further, after an interruption, although the interrupt information is usually saved to the stack memory as described above, this stack memory area may be the same as in the information stack memory or different therefrom.

Figure 3:
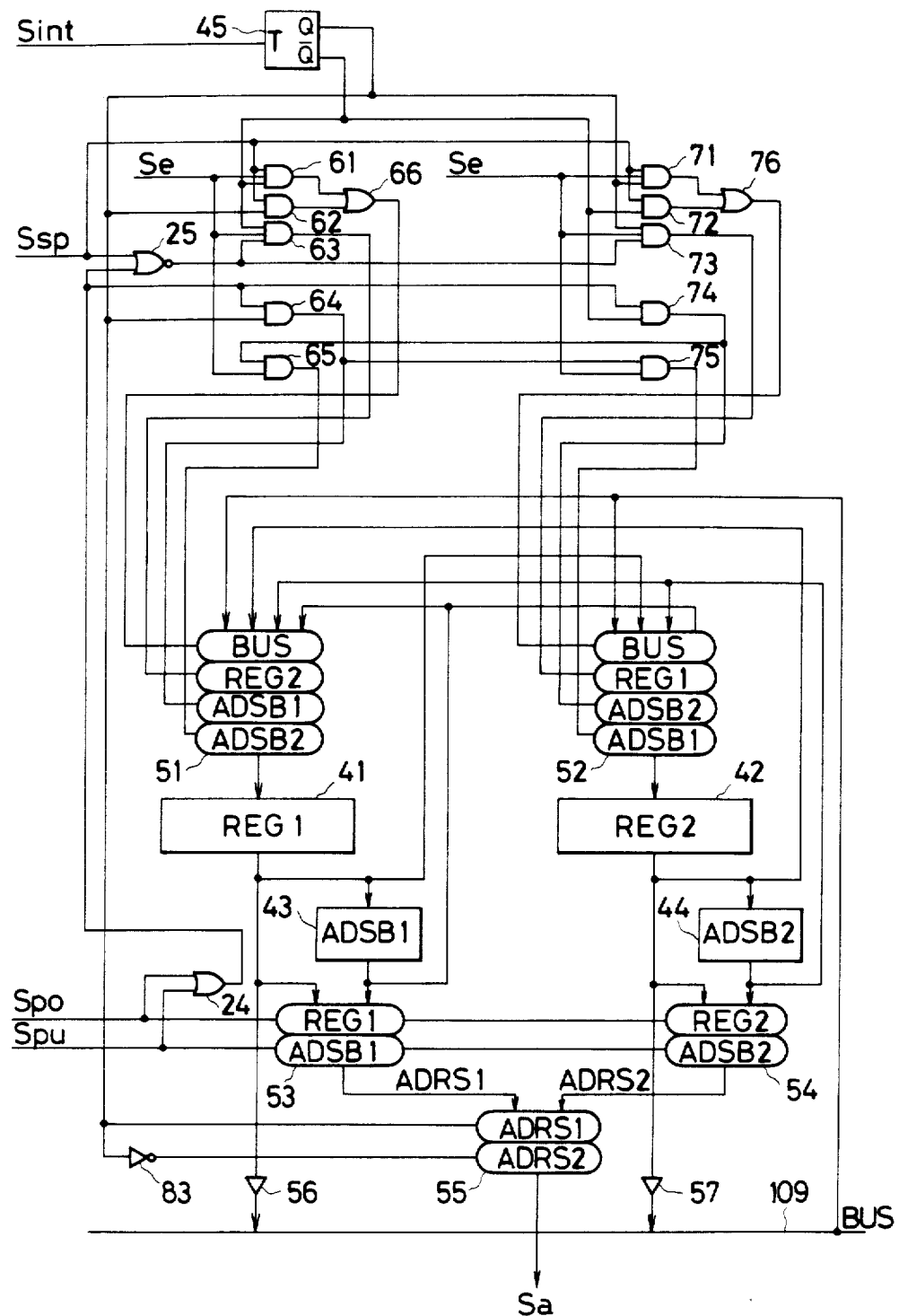
FIG. 3 is a circuit diagram of a second embodiment of the stack pointer control circuit according to the present invention.

FIG. 3 shows a circuit diagram of a second embodiment of the stack pointer control circuit according to the present invention. The stack pointer shown in FIG. 3 is basically the same as that shown in FIG. 1 in the circuit configuration and the operation. In corresponding to the first register 1, the second register 2, the first selector circuit 11 and the second selector circuit 12 all shown in FIG. 1, there are provided a first register 41, a second register 42, a first selector circuit 51 and a second selector circuit 52, respectively. Further, in correspondence to the third selector circuit 13 shown in FIG. 1, there are provided a third selector circuit 53, a fourth selector circuit 54 and a fifth selector circuit 55. In correspondence to the adder subtracter circuit 3 shown in FIG. 1, a first adder/subtracter circuit 43 is provided for a first register 41, and a second adder/subtracter circuit 44 is provided for a second register 42, respectively, in FIG. 3. Further, in correspondence to each gate 21, 22 or 23 for the second selector circuit 12 shown in FIG. 1, gates 61 to 66 are provided for a first selector circuit 51 shown in FIG. 3 and gates 71 to 76 are provided for a second selector circuit 52. Further, in correspondence to the try state driver 26 shown in FIG. 1, a try state driver 56 is provided for the first register 41 and a try state driver 57 is provided for the second driver 42 respectively, in FIG. 3. Further, an inverter 83 and a selecting flip-flop 45 are newly provided as elements not included in the circuit shown in FIG. 1.

An interrupt signal $S_{int}$ is supplied to the input of this flip-flop 45. Whenever this signal $S_{int}$ is inputted, this flip-flop is changed into a first state where the output Q is set to "1" or a second state where the output $\overline{Q}$ is set to "1".

When this flip-flop 45 is set to the first state, each gate circuit is activated in response to a "1" level Q output signal of this flip-flop 45 and the already-described stack access signal $S_{po}$ or $S_{pu}$, all the elements of the first register 41, the second register 42, the first selector circuit 51, the second selector circuit 52, the first adder/subtracter circuit 43, and the third selector circuit 53 or the fifth selector circuit 55 are set respectively so as to correspond to the first register 1, the second register 2, the first selector circuit 11, the second selector circuit 12, the adder/subtracter circuit 3, and the third selector circuit 13, respectively, shown in FIG. 1. In the circuit configuration thus set, the stack control operation the same as in the stack pointer control circuit shown in FIG. 1 will be effected.

Further, where the flip-flop is reset to the second state, each gate circuit is activated in response to a "1" level $\overline{Q}$ output signal of this flip-flop 45 and the already-described stack access signal $S_{po}$ or $S_{pu}$; and all the elements of the second register 42, the first register 41, the second selector circuit 52, the first selector circuit 51, the second adder/subtracter circuit 44, and the fourth selecter circuit 54 or the fifth selector circuit 53 are set respectively so as to correspond to the first register 1, the second register 2, the first selector circuit 11, the second selector circuit 12, the adder/subtracter circuit 3, and the third selector circuit 13, respectively, as shown in FIG. 1. In the circuit configuration thus set, the stack control operation the same as in the stack pointer control circuit shown in FIG. 1 will be effected.

However, as already described, in case an interruption occurs during the push instruction or the pop instruction, although a value in the second register 2 is set to the first register 1 in response to the interrupt signal $S_{int}$ in the case of the stack pointer control circuit shown in FIG. 1, in the case of the stack pointer control circuit shown in FIG. 3, the flip-flop 45 is simply inverted in response to the interrupt signal $S_{int}$, without effecting the operation as already described with reference to FIG. 1. This is because in the case where the flip-flop 45 is at the first state and therefore the first register 41 is activated in correspondence to the first register 1 shown in FIG. 1, the old top-of-stack address $A_{top}$ obtained at the start of the present pop instruction execution is stored unchanged in the second register 42. This is quite the same even when the flip-flop 45 is set at the second state.

What is claimed is:

1. A stack pointer control circuit for designating stack memory addresses to save and/or return information, from a predetermined register to a stack memory or vice versa, which comprises:

(a) first register means for storing a stack memory address to be read next;

(b) updating means for updating the address stored in said first register means;

(c) second register means for storing a same stack memory address as that stored in said first register means at a start of an information saving and/or return operation;

(d) setting means for setting the same stack memory address as that stored in said first register means to said second register means at the start of an information saving and/or return operation;

(e) designating means for designating a stack memory address stored in said first register means in response to an information saving and/or return operation start signal for the information saving and-/or return operation; and (f) stopped address processing means for setting an address stored in said second register means to said first register means in response to a stop signal generated during the information saving and/or return operation.

2. The stack pointer control circuit as set forth in claim 1, wherein said updating means comprises an adder/subtracter circuit for counting up or down from an address stored in said first register means and setting the counted address to said first register means.

3. The stack pointer control circuit as set forth in claim 1, wherein said designating means and said stopped address processing means are a first selector circuit provided on an address input side of said first register means and second and third selector circuit provided on an address output side of said first register means, respectively.

4. The stack pointer control circuit as set forth in claim 3, wherein said setting means is the second selector circuit provided on an address input side of said second register means.

5. The stack pointer control circuit as set forth in claim 1, wherein the stop signal is an interrupt signal generated when an interruption occurs.

6. The stack pointer control circuit as set forth in claim 5, wherein the designating or setting are done by said stopped address processing means when the information saving and/or return operation is reexecuted after an interruption has been processed.

7. The stack pointer control circuit as set forht in claim 1, which further comprises:

(a) state setting means for setting a first state and a second state alternately whenever the stop signal is supplied thereto; and (b) operation exchange means for controlling said first register means and said second register means so that operating of both said register means are exchanged whenever said state setting means changes in state.

8. A stack pointer control circuit for saving a value from a predetermined register to a stack memory and returning the value read out of the stack memory to the predetermined register, which comprises:

(a) first register means for storing a stack memory address to be read next;

(b) second register means for storing an address stored in said first register means at a start of a saving or return operation;

(c) control means for saving a value stored in the predetermined register to the stack memory in response to the address stored in said first register means and for returning the value read out of the stack memory to the predetermined register in response to the address stored in said first register means; and (d) stopped address processing means for setting a value in said second register means to said first register means in response to a stop signal generated during the saving or return operation.

9. The stack pointer control circuit as set forth in claim 8, wherein said control means comprises:

(a) state setting means for setting a first state and a second state alternately whenever the stop signal is supplied thereto;

(b) operation exchange means for controlling said first register means and said second register means so that operations of both said register means are exchanged when said state setting means is at the second state; and wherein said stopped address processing means being activated when a value is exchanged between said first register means and said second register means by said state setting means and said operation exchange means reversed whenever the stop signal is supplied.

* * * * *